(12) United States Patent
Thompson et al.

(10) Patent No.: US 9,119,340 B2
(45) Date of Patent: Sep. 1, 2015

(54) ORGANIC SOIL AMENDMENTS STORAGE AND DISPENSING SYSTEM

(71) Applicant: Holganix, LLC, Glen Mills, PA (US)

(72) Inventors: David Norman Thompson, Chadds Ford, PA (US); Kevin Thomas Mummert, Wilmington, DE (US); Barrett Ersek, West Chester, PA (US)

(73) Assignee: Holganix, LLC, Glen Mills, PA (US)

( * ) Notice: Subject to any disclaimer, the term of this patent is extended or adjusted under 35 U.S.C. 154(b) by 153 days.

(21) Appl. No.: 13/866,352

(22) Filed: Apr. 19, 2013

(65) Prior Publication Data

US 2014/0138407 A1 May 22, 2014

Related U.S. Application Data

(60) Provisional application No. 61/636,120, filed on Apr. 20, 2012.

(51) Int. Cl.
*A01C 23/00* (2006.01)
*A01C 23/04* (2006.01)
*C02F 1/68* (2006.01)
*C05F 17/00* (2006.01)

(52) U.S. Cl.
CPC ............ *A01C 23/008* (2013.01); *A01C 23/042* (2013.01); *C02F 1/686* (2013.01); *C05F 17/0018* (2013.01); *Y02W 30/43* (2015.05)

(58) Field of Classification Search
CPC .. A01C 23/007; A01C 23/008; A01C 23/042; C02F 1/686; C05F 17/0018
USPC ................... 222/146.6, 145.5, 145.6, 23, 133
See application file for complete search history.

(56) References Cited

U.S. PATENT DOCUMENTS

| 4,427,434 | A  | * | 1/1984  | Eastin         | 71/54    |
|-----------|----|---|---------|----------------|----------|
| 5,549,729 | A  | * | 8/1996  | Yamashita      | 71/26    |
| 6,727,090 | B1 | * | 4/2004  | Hronek         | 435/290.4|
| 8,191,798 | B2 | * | 6/2012  | Hahn et al.    | 239/157  |
| 2002/0108414 | A1 | * | 8/2002 | McNelly       | 71/9     |
| 2002/0164781 | A1 | * | 11/2002 | Alms et al.  | 435/290.1|
| 2003/0075501 | A1 | * | 4/2003  | Wilkie       | 210/615  |
| 2011/0040503 | A1 | * | 2/2011  | Rogers et al. | 702/55  |
| 2011/0174893 | A1 | * | 7/2011  | Allan et al. | 239/8    |
| 2013/0269735 | A1 | * | 10/2013 | Roetzel et al. | 134/40 |

FOREIGN PATENT DOCUMENTS

CA     2216332 A1 *  3/1999

* cited by examiner

*Primary Examiner* — Donnell Long
(74) *Attorney, Agent, or Firm* — Blank Rome LLP

(57) ABSTRACT

The present invention provides a fluid storage and dispensing system for an organic soil amendment concentrate or fertilizer, comprises a storage tank, which comprises a fluid inlet and a fluid outlet, wherein the storage tank is refrigerated, a first flow meter connecting the fluid outlet of the storage tank on one end and a product tank on the other end, a second flow meter connecting to a water supply line on one end, an eductor connecting to the second flow meter on one end and the product tank on the other end, wherein the a concentrate stored in the storage tank is metered in via the first flow meter and mixed in the product tank with water metered via the second flow meter. As one aspect of the invention, the storage tank comprises interconnected holding tanks that are re-circulated. At least one water tank may be included between the water supply and the second flow meter.

24 Claims, 4 Drawing Sheets

ORGANIC SOIL AMENDMENTS STORAGE AND DISPENSING SYSTEM

RELATED APPLICATION

This application claims priority to U.S. Provisional Application No. 61/636,120, filed on Apr. 20, 2012. The disclosure of which is incorporated by reference in this application in its entirety.

FIELD OF INVENTION

This invention relates to a system for storing and dispensing soil amendments or fertilizer. Particularly, the present invention provides a refrigerated storage and metered dilution of a soil amendment or fertilizer concentrate.

BACKGROUND OF THE INVENTION

A previous invention disclosed in U.S. patent Ser. No. 13/089,576 describes the production of a concentrated organic soil amendment. This organic soil amendment and similar concentrated compost tea is typically supplied in a concentrated liquid form. This concentrated organic soil amendment allows reduced shipping volume and weight of the product. It also can be stored at reduced temperature thereby minimizing adverse effects to the efficacy of the product. The concentrated liquid soil amendment or fertilizer needs to be diluted before administering to plants and/or soil, such as turf grass or crops. When the administering area is large, a vehicle mounted tank is typically required. Diluting large quantities of concentrate can be slow and cumbersome, and may also pose occupational hazard to the operators if they have to carry heavy containers of the soil amendment or fertilizer atop a vehicle mounted tank. A convenient, fast and safe soil amendment and fertilizer storage and dispensing system is thus desired.

SUMMARY OF THE INVENTION

The present invention provides a fluid storage and dispensing system for an organic soil amendment or fertilizer concentrate, comprises a storage tank, comprising a fluid inlet and a fluid outlet, wherein the storage tank is refrigerated, a first flow meter connecting the fluid outlet of the storage tank on one end and a product tank on the other end, an eductor connecting to a water supply on one end and the product tank on the other end, wherein the a concentrate stored in the storage tank is metered in via the first flow meter and mixed in the product tank with water from the water supply.

According to one aspect of the present invention, the fluid storage and dispensing system further comprises a pump capable of moving the concentrate from the storage tank via the first flow meter to the product tank.

According to another aspect of the present invention, the fluid storage and dispensing system further comprises a second flow meter connecting to the water supply.

According to another aspect of the present invention, the eductor is a venturi mixer. The eductor may further comprise a supplement hopper.

According to an additional aspect of the present invention, the fluid storage and dispensing system further comprises a bypass loop bypassing the eductor. The bypass loop may further comprise a bypass valve.

According to one embodiment of the present invention, the storage tank comprises a first holding tank and a second holding tank, wherein the first and second holding tanks are connected. The storage tank may further comprise a recirculation pump.

According to another aspect of the present invention, the storage tank may further comprise an inlet for receiving fluid. The inlet may comprise a quick connect coupling.

According to a further aspect of the present invention, the fluid storage and dispensing system further comprises a water tank connecting to the water supply line. The water tank may comprise a shutoff valve and a water level sensor, wherein the water level turns off the water supply when the water level triggers the water level sensor at a predetermined level. The water tank may further comprise a pump at an outlet of the water tank.

According to an additional aspect of the present invention, the fluid storage and dispensing system further comprises a first back flow check valve inline of the first flow meter, preventing back flow into the storage tank.

According to a yet another aspect of the present invention, the fluid storage and dispensing system further comprises a second back flow check valve inline of the second flow meter, preventing back flow into the water supply line.

According to an aspect of the present invention, the fluid storage and dispensing system further comprises a feed stock quick connect coupling before the eductor. The feed stock quick connect coupling may allow connection of a feed stock hose for introducing liquid fertilizer or supplement to the eductor.

According to another aspect of the present invention, the eductor can be disconnected via one or more quick connect couplings.

According to a further aspect of the present invention, the fluid storage and dispensing system further comprises a product tank quick connect coupling allowing connecting a hose that feeds the product tank.

According to an additional aspect of the present invention, the fluid storage and dispensing system further comprises a water supply quick connect coupling allowing connection to the water supply line.

According to another aspect of the present invention, the product tank comprising a volume indicator.

According to one aspect of the present invention, the storage tank is an interior chamber of a refrigeration unit.

According to another aspect of the present invention, the storage tank is a lined interior chamber of a refrigeration unit.

DESCRIPTION OF THE DRAWINGS

Other objects, features and advantages of the present invention will become more fully apparent from the following detailed description of the preferred embodiment and the accompanying drawings in which.

DETAILED DESCRIPTION OF THE INVENTION

Organic soil amendments provide environmentally friendly ways to increase plant health. An example of organic soil amendments is disclosed in US patent publication US20120090365 A1. With the application of the soil amendments, significantly less fertilizers and pesticides are required. The organic soil amendments are typically a concentrated live culture of beneficial microorganisms. Before administration to the plants, the organic soil amendments are diluted. The present invention provides a superior system for storing and dispensing concentrated organic soil amendments or fertilizers.

Figure 1:
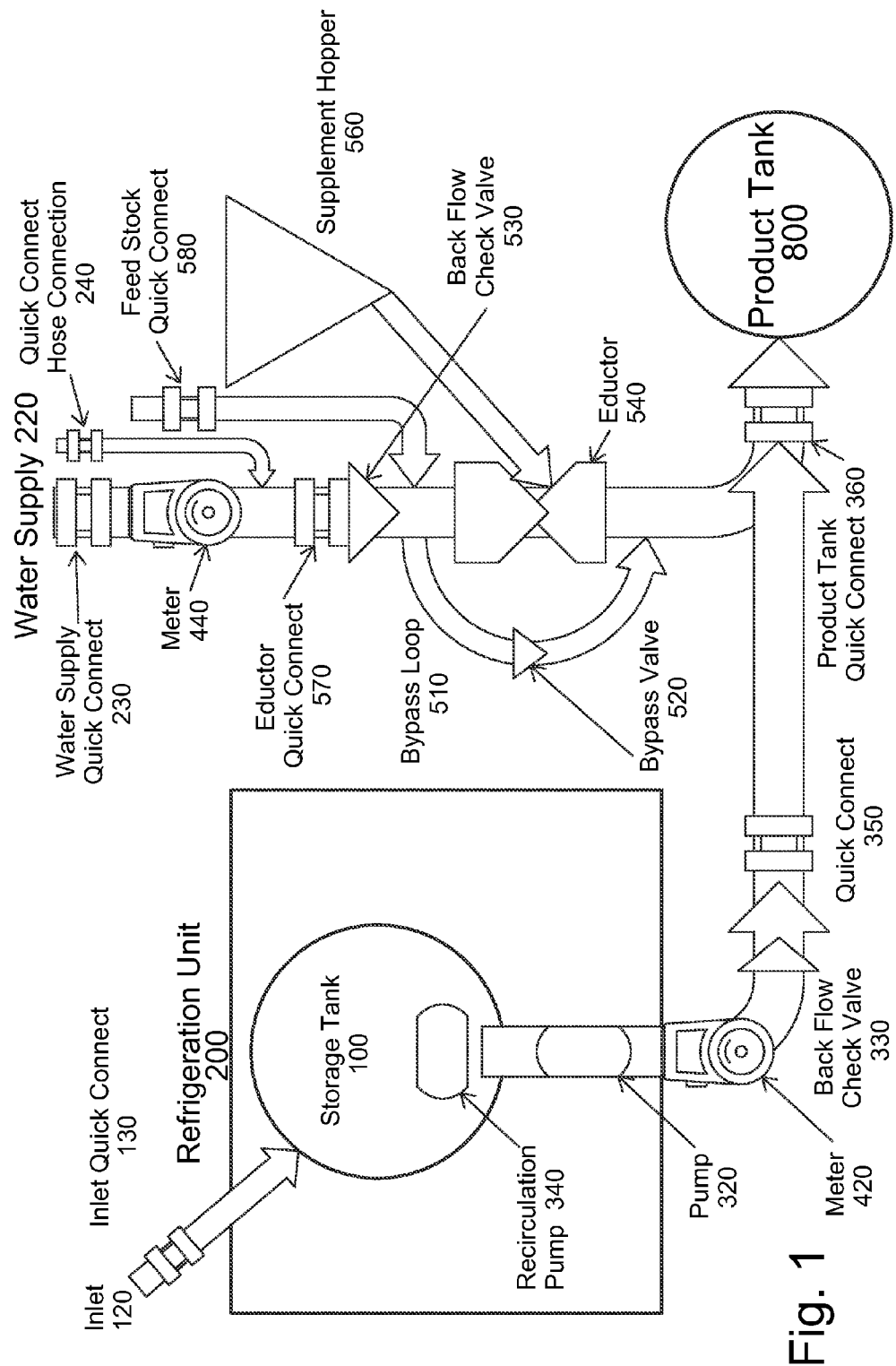
FIG. 1 is a diagram of one embodiment of the present invention.

FIG. 1 illustrates one embodiment of the present invention. In this particular embodiment, the present invention comprises a storage tank 100 for storing organic soil amendment concentrate. The storage tank 100 is refrigerated to maintain the viability of the beneficial microorganisms in the organic soil amendment, and also keeping the beneficial microorganisms in a dormant state. According to FIG. 1, the storage tank 100 is housed in a refrigeration unit 200. The refrigeration unit may be any refrigerator that can provide necessary temperature control for the storage of the organic soil amendment concentrate, and provide adequate interior space to accommodate the storage tank 100. The organic soil amendment concentrate is preferably stored at 32-44° F. The organic soil amendment concentrate preferably is slowly agitated or recirculated in the storage tank 100, such as with a recirculation pump 340.

A pump 320 can move the stored organic soil amendment concentrate from the storage tank 100 and though a first flow meter 420 to a product tank 800. A predetermined amount of organic soil amendment concentrate thus can be precisely moved from the storage tank 100 to the product tank 800.

An optional back flow check valve 330 can also be installed. The back flow check valve 330 prevents back flow into the storage tank 100.

Water supply, for example water from a water tank, can be measured through a second flow meter 440, and infused into product tank 800. A predetermined amount of water can also be delivered to the product tank 800, achieving precise dilution of the organic soil amendment concentrate. The water supply may be a water tank, or a water line from a public or private water source. The water supply is preferably free of chlorine and any chemicals that would inhibit the viability of the beneficial microorganism in the organic soil amendment concentrate.

The embodiment of the present invention shown in FIG. 1 also comprises an eductor 540 between the second flow meter 440 and the product tank 800. The eductor 540 can be a venturi mixer, or any other mixer suitable for introducing solid or liquid supplements into the system. The eductor 540 may be connected to a supplement hopper 560, where solid or liquid supplements maybe added to the supplement hopper 560 and mixed in with the diluted organic soil amendments. The solid or liquid supplements may be fertilizers, fungicides, pesticides, or any other supplements that may be used with the organic soil amendments. The supplements can be gravity fed or pumped into the eductor 540. A bypass loop 510 can also be installed to bypass the eductor 540. A bypass valve 520 can be used to select the flow path through the eductor 540 or the bypass loop 510.

Preferably, for ease of use, a number of quick connect or cam locks can be utilized in the present invention. For example, inlet 120 is used for filling the storage tank 100. An inlet quick connect 130 can be installed at the receiving end of the inlet 120 for quickly connecting the inlet 120 to a feed line for organic soil amendment. Water supply quick connect 230 can also be installed to allow easy connection to the water supply 220. Product tank quick connect 360 allows the easy disconnect of product tank 800 or a hose that feed the product tank 800 from the system.

Quick connect 350 can be installed between the first flow meter 420 and the eductor 540, and eductor quick connect 570 can be installed between the second flow meter 440 and the eductor 540. These quick connects 350 and 570 allow the easy disassembly of the eductor assembly, i.e., eductor 540, eductor bypass loop 510, supplemental hopper 560 from the system. This is particularly advantages when the eductor assembly is installed outdoors and needs to be moved indoors in colder weather to prevent freezing.

An optional feed stock quick connect 580 can be installed in-line to the eductor 540 to allow connection of a hose that feeds the system with liquid fertilizer or other supplements, which bypasses the supplement hopper 560. Additionally, an optional back flow check valve 530 can be installed to prevent back flow of the supplements to the water supply 220.

Additionally, an optional quick connect hose connection 240 can be installed to facilitate the easy cleaning of the storage tank 100 and surrounding equipment; e.g. a water hose to wash equipment.

Figure 2:
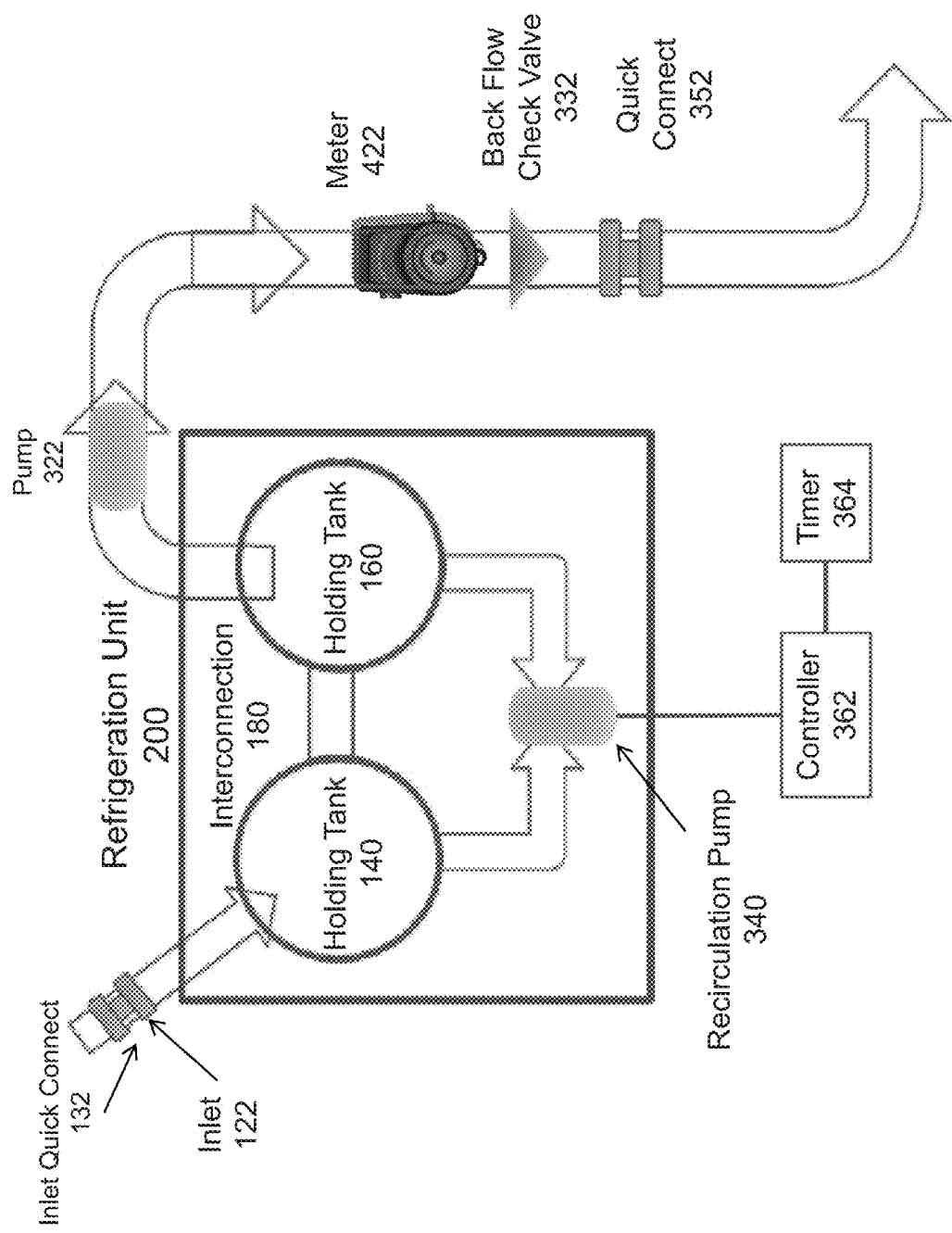
FIG. 2 is a diagram of an alternative embodiment of the storage tank of the present invention.

In an alternative embodiment shown in FIG. 2, the storage tank comprises a number of holding tanks for concentrates, two of which are depicted 140 and 160. The holding tanks are interconnected, for example, through interconnecting hose 180. A recirculation pump 340 can be used to move organic soil amendments from one holding tank 140 to another holding tank 160, and vise versa. A timer 364 can be utilized to control the recirculation pump 340. The recirculation pump 340 can be a single speed pump or a variable speed pump controlled by an optional controller 362. Recirculation of the organic soil amendment at a slow speed inhibits the formation of bio-film. The holding tanks can be self-leveling. Fluid levels of the holding tanks can also be kept at approximately the same through other means.

In the embodiment shown in FIG. 2, an inlet 122 with inlet quick connect 132 can be used to feed the holding tanks 140 and 160. Pump 322 is configured to move the organic soil amendment concentrate from the holding tanks 140 and 160 through flow meter 422 to the eductor assembly or the product tank 800. A back flow check valve 332 and a quick connect 352 can also be installed. Other components described in the context of FIG. 1 can also be used in combination with the storage tank embodiment of FIG. 2.

In another embodiment, a product tank 800 with a volume indicator, such as markings indicating a predetermined volume, a graduated scale, a fluid level gauge, or a float level gauge can be used with the present invention. Fluid volume in the product tank 800 can be directly read from the volume indicator. Water from the water supply can be measured directly by the volume indictor of the product tank 800. In this configuration, only one flow meter is needed to measure the amount of soil amendment or fertilizer that is pumped into the product tank. Soil amendment concentrate or fertilizer can be metered into the product tank and diluted by filling water to an appropriate volume according to the volume indicator.

In an additional embodiment, the amount of concentrate can also be measured using the volume indicator of the product tank 800 when pumped into the product tank 800. Such a configuration further simplifies the system and may eliminate the need for the first flow meter.

Figure 3:
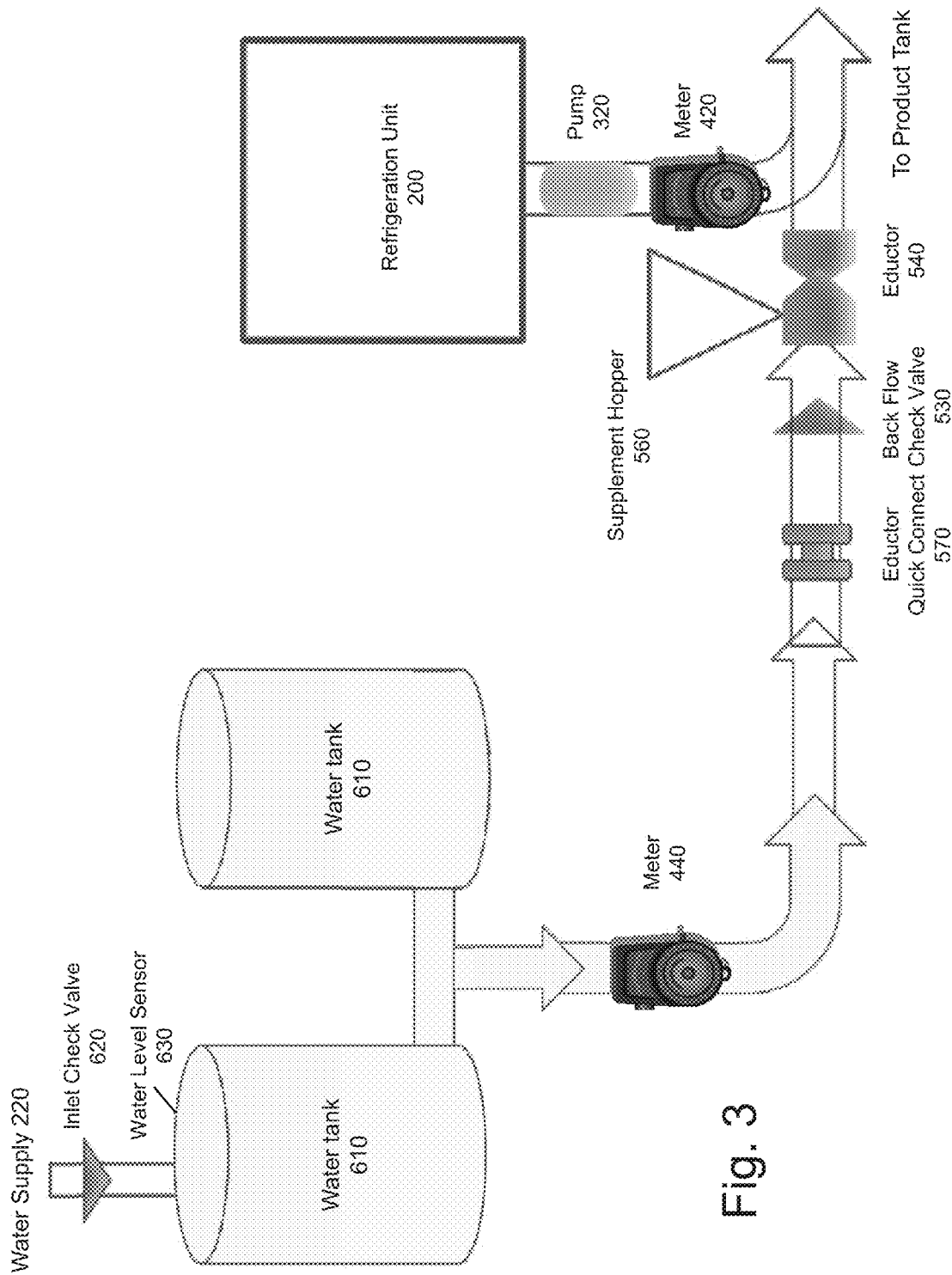
FIG. 3 is a diagram of another alternative embodiment of the present invention comprising a least one water tank.

In some locations of where the present invention is installed, the water pressure of the available water supply may not be sufficient to fill the product tank in a reasonable amount of time. In another embodiment of the invention, at least one water tank 610 is installed between the water supply 220 and the meter 440. In the example shown in FIG. 3, two water tanks are shown for illustration purposes. It is understood, that a plurality of water tanks are also contemplated by this invention. Water from the water supply 220 can be allowed to fill the water tanks 610 slowly prior to use. An inlet shutoff valve 620 is installed on the water supply line, and is controlled by a water level sensor 630 that is installed in the at least one of the water tanks 610. When the water level reaches a predetermined level, the water level sensor 630 turns off the inlet shutoff valve 620. In the configuration shown in FIG. 3, the water tanks 610 are set essentially on the same level, and the tanks 610 are inter connected. The water supply 220 fills all the water tanks 610 at the same time. The water sensor 630 and inlet shutoff valve 620 ensures the water tanks 610 are not filled over their capacity. It is also within the scope of this invention to include a water shutoff valve and water level sensors for each or some of the water tanks in this configuration. The inlet shutoff valves 620 and water level sensor 630 can be integrated or installed as two separate components. The inlet shutoff valves 620 and water level sensor 630 may be a valve mechanically connected to a float, or a valve electronically connected to a water level sensor, which senses water level via a float or a pressure sensor, or any mechanisms known to one skilled in the art. A pump 640 is installed at the outlet of the water tanks 610. Water tank outlet is typically connected using large diameter tubing or pipes, e.g., 2 inch PVC pipe, the pump 640 enables the rapid filling of the product tank 800. The inclusion of water tanks 610 also may allow the water from the water supply to stand for a period prior to use. It gives time for the chlorine usually found in city water to dissipate prior to use.

Figure 4:
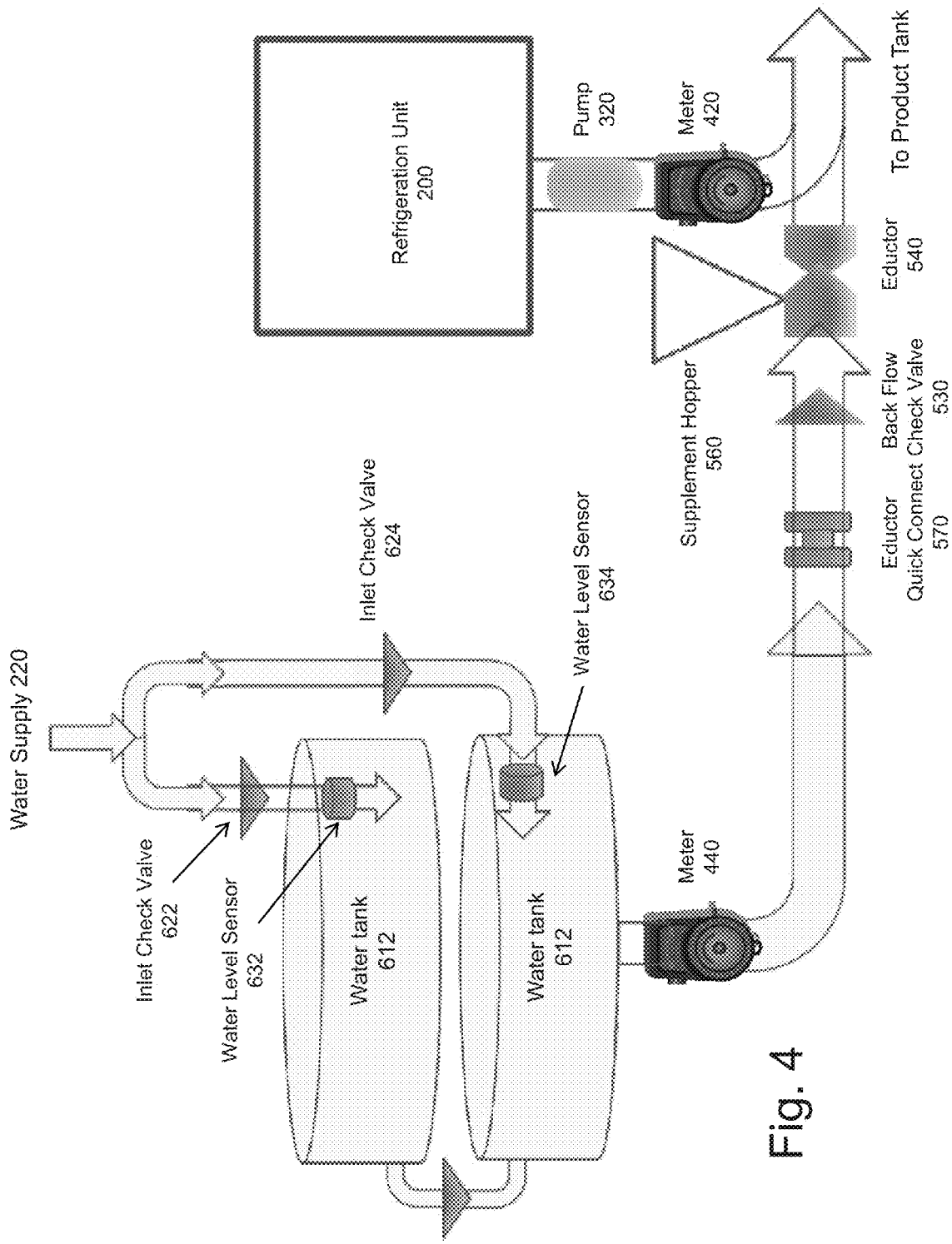
FIG. 4 is a diagram of a further alternative embodiment of the present invention comprising a least one water tank in another arrangement.

FIG. 4 illustrates an alternative configuration of the water tanks 612 in a stacked configuration. In the configuration shown, each of the water tanks 612 is fed through a branch of the water supply 220. Each branch of the water supply 220 for each of the water tanks 612 comprises an inlet shutoff valve 622 624, and a water level sensor 632 634. The water level sensors 632 634 independently controls the inlet shutoff valves 622 624, and maintain the water level in each of the water tanks 612 not exceeding its capacity. The water tanks are interconnected, and the flow among tanks can be controlled by water tank interconnect valve 642. A pump 644 is connected to the outlet of the water tanks 612 and can rapidly fill the product tank 800.

In a further embodiment of the invention, the storage tank 100 may be formed directly with the interior chamber of the refrigeration unit 200. For instance, a water impermeable flexible barrier or liner may be used to line to the interior chamber of a refrigeration unit forming a storage chamber, and the organic soil amendment concentrate may be stored within. This barrier or liner may be preferred, but is not required if the interior chamber of the refrigeration unit is sealed and is chemically stable to exposure of organic soil amendment concentrate. A refrigeration unit with a top opening, such as a chest refrigerator, or a freezer chest with its temperature control set to refrigeration temperature, is generally preferred for this application. In this particular embodiment, the refrigeration of the organic soil amendment concentrate is more efficient, since the storage chamber makes maximum contact with the cooling surfaces of the refrigeration unit 200. The organic soil amendment concentrate store in the storage chamber may also be agitated or recirculated, such as using a recirculation pump as previously described. The storage chamber and the refrigeration unit can be used with any embodiments previously described, and connect to any other components of the invention. Preferably, the storage chamber may be outfitted with an inlet for filling the storage chamber with organic soil amendment concentrate. The stored organic soil amendment concentrate may also be pumped and metered to the product tank through a flow meter as previously described.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What we claim:

1. A fluid storage and dispensing system for an organic soil amendment concentrate or fertilizer concentrate, comprising
   a storage tank, comprising a fluid inlet and a fluid outlet, wherein the storage tank is refrigerated;
   a first flow meter connecting the fluid outlet of the storage tank on one end and a product tank on the other end;
   an eductor connecting a water supply on one end and the product tank on the other end;
   wherein the organic soil amendment concentrate or fertilizer concentrate stored in the storage tank is metered in via the first flow meter and mixed in the product tank with water from the water supply.

2. The fluid storage and dispensing system of claim 1, further comprising a pump capable of moving the concentrate from the storage tank via the first flow meter to the product tank.

3. The fluid storage and dispensing system of claim 1, further comprising a second flow meter between the water supply and the eductor.

4. The fluid storage and dispensing system of claim 1, wherein the eductor is a venturi mixer.

5. The fluid storage and dispensing system of claim 1, wherein the eductor further comprising a supplement hopper.

6. The fluid storage and dispensing system of claim 1, further comprising a bypass loop bypassing the eductor.

7. The fluid storage and dispensing system of claim 6, wherein the bypass loop further comprising a bypass valve.

8. The fluid storage and dispensing system of claim 1, wherein the storage tank comprising at least a first holding tank and a second holding tank, wherein the first and second holding tanks are connected.

9. The fluid storage and dispensing system of claim 1, wherein the storage tank further comprising a recirculation pump.

10. The fluid storage and dispensing system of claim 1, wherein the storage tank further comprising an inlet for receiving fluid.

11. The fluid storage and dispensing system of claim 10, wherein the inlet comprising a quick connect coupling.

12. The fluid storage and dispensing system of claim 1, further comprising a water tank connecting to the water supply.

13. The fluid storage and dispensing system of claim 12, wherein the water tank comprises a shutoff valve and a water level sensor, wherein the water level turns off the water supply when the water level triggers the water level sensor at a predetermined level.

14. The fluid storage and dispensing system of claim 12, further comprising a pump at an outlet of the water tank.

15. The fluid storage and dispensing system of claim 1, further comprising a first back flow check valve inline of the first flow meter, preventing back flow into the storage tank.

16. The fluid storage and dispensing system of claim 15, further comprising a second back flow check valve inline of a second flow meter, preventing back flow into the water supply.

17. The fluid storage and dispensing system of claim 1, further comprising a feed stock quick connect coupling before the eductor.

18. The fluid storage and dispensing system of claim 17, wherein the feed stock quick connect coupling allows connection of a feed stock hose for introducing liquid fertilizer or supplement to the eductor.

19. The fluid storage and dispensing system of claim 1, wherein the eductor can be disconnected via one or more quick connect couplings.

20. The fluid storage and dispensing system of claim 1, further comprising a product tank quick connect coupling allowing connecting a hose that feeds the product tank.

21. The fluid storage and dispensing system of claim 1, further comprising a water supply quick connect coupling allowing connection to the water supply.

22. The fluid storage and dispensing system of claim 1, wherein the product tank comprising a volume indicator.

23. The fluid storage and dispensing system of claim 1, wherein the storage tank is an interior chamber of a refrigeration unit.

24. The fluid storage and dispensing system of claim 23, wherein the storage tank is a lined interior chamber of a refrigeration unit.

* * * * *